Dec. 8, 1959   D. W. JOHNSON   2,916,722
WIRE TERMINAL CONNECTION
Filed Dec. 10, 1956
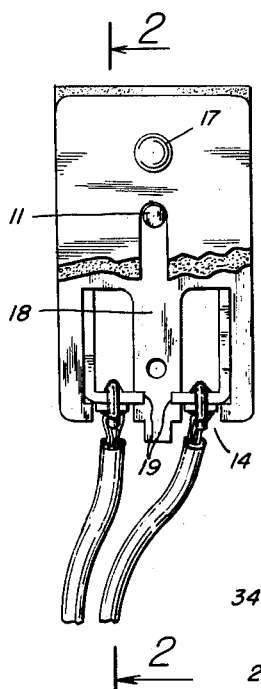
FIG. 1
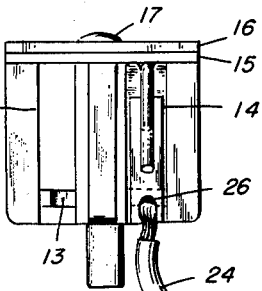
FIG. 4
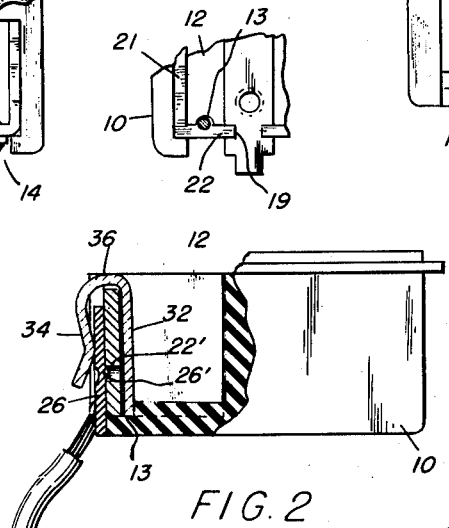
FIG. 2
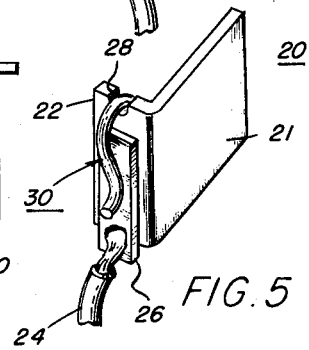
FIG. 3
FIG. 5
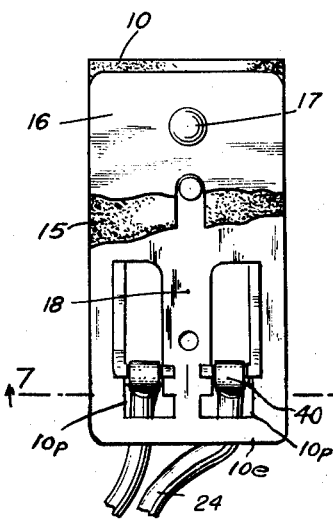
FIG. 6
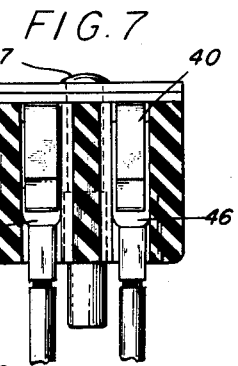
FIG. 7
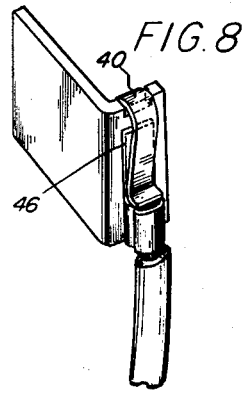
FIG. 8
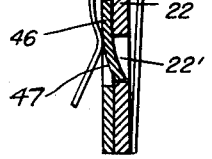
FIG. 9
INVENTOR.
David W. Johnson
BY his attorneys

United States Patent Office 2,916,722
Patented Dec. 8, 1959

2,916,722

WIRE TERMINAL CONNECTION

David W. Johnson, Newington, Conn., assignor to The Arrow-Hart & Hegeman Electric Company, Hartford, Conn., a corporation of Connecticut Application December 10, 1956, Serial No. 627,291

3 Claims. (Cl. 339—210)

This invention relates to connections for wires to the contacts of electric switches and the like. More particularly, it relates to a terminal connection which is particularly adapted for connecting feed wires commonly known as pigtail leads to switch contacts of appliance switches.

Electric switches are commonly found on electrical appliances which include electric motors or vibrating parts causing considerable vibration of the assembled appliance during use. Terminal connections made with binding screws have given difficulty in the past due to vibration causing loosening of the screw and allowing the wire to become loose or disengaged. When soldered pigtail leads were used, soldering of the pigtail leads to switch parts prior to assembling into the switches caused awkward and sometimes difficult assembly operations. If the soldering were done after the switch was assembled, time-consuming operations were necessary; and if the terminal or any part were damaged, the whole work of assembling the device was lost, or delay and increased cost for repairs were necessary. The present invention overcomes the aforesaid difficulties by a novel and simple arrangement which cuts down the cost of assembly and at the same time offers added advantages.

Therefore, an objective achieved by the invention is the provision of a connection for a pigtail lead to a contact or terminal plate of an electrical switch or the like which may be attached and detached quickly and yet provide a firm and effective connection not subject to dislocation due to vibration in the course of use if the appliance embodies a motor, vibrator or the like.

Another object of the invention is to provide a terminal connection which may be quickly attached to an otherwise completely assembled electric switch by a simple sliding motion and which will not be subject to loosening or dislocation by vibration in use.

Another object is to provide a connection having the aforesaid advantages, which can be made from stamped parts in volume at low cost and assembled with lowered labor costs.

Other objects and advantages will become apparent as the invention is described in connection with the accompanying drawing.

In the drawing:

Fig. 1 is a plan view, partly broken away, illustrating one form of the invention.

Fig. 2 is a side elevation view, partly broken away, of the structure of Fig. 1.

Fig. 3 is an end elevation view of the structure in Fig. 1.

Fig. 4 is a fragmentary view of one corner of the structure of Fig. 1 with the connection omitted.

Fig. 5 is a perspective view of the connection to a switch contact removed from the casing.

Fig. 6 is a view similar to Fig. 1 of another form of the invention.

Fig. 7 is a transverse section view along line 7—7 of Fig. 6.

Fig. 8 is a view similar to Fig. 5 of the form of Figs. 6 and 7.

Fig. 9 is a fragmentary detail sectional view of a portion of the structure of Figs. 6-8.

Referring to the drawing, a molded insulating casing 10 of rectangular or other conventional exterior form is hollowed out from its top surface, providing a cavity or cavities for the switch contacts and the switch operating parts, the operating parts being omitted for clarity. Preferably one end of the casing has an opening or a pair of parallel opening 14 running from front to rear of the casing in one or both end walls. Upon the open top of the casing, a stamped insulation plate 15 is laid and held by a flat sheet metal plate 16 lying thereon. Normally, the plate 16 will be a mounting plate and may be of any suitable form adapted for the many uses to which electric switches of this type or other electric devices may be put in various tools and appliances. It will be understood by those skilled in the art that an operating element 11 may be extended through registering apertures in the insulating and cover plates 15 and 16 and that such plates may be held upon the casing by rivets or securing screws 17 or in any other suitable conventional fashion.

A central partition 18 is or may be formed within the casing to divide it into compartments, if desired. In the walls of the partition 18 at its juncture with the end wall of the casing, identical slots 19 may be formed running from front to rear of the casing, each adapted to receive one edge of a contact and terminal member which is designated generally by the numeral 20.

As illustrated, the contact and terminal member may be of L-shape and stamped from sheet metal with a contact portion or leg 21 lying along the inner surface of the longitudinal side wall of the casing in position to be engaged and disengaged by a movable bridging contact (not shown). The terminal portion or leg 22 at right angles to the portion 21 may have its edge slidable in the slot 19. When the contact member is slid from front to rear into the casing, it is held in the position shown by the leg 21 lying against the longitudinal side wall and by the edge of the short leg 22 lying in the slot 19. It will be understood that the form of the contact portion 21 may be varied to suit the different forms of bridging contact by which it may be engaged. When the contact and terminal member is in position in the casing, the outer face of the terminal portion 22 will be visible and accessible from the exterior of the casing. By extending the contact and terminal member 20 to the top of the casing, the plates 15 and 16 hold the contact from movement forwardly.

A pigtail lead wire 24 is soldered, welded or attached by crimping or any other suitable manner to a narrow stamped sheet metal plate 26 which is adapted to slide over and be held against the exposed exterior surface of the terminal portion 22.

For holding the terminal plate 26 against the terminal portion 22, a round wire clip 30 bent into U-shape and formed from spring metal having considerable strength so as to be capable of exerting considerable pressure is positioned with one leg 32 inside the casing pressing against the interior surface of the terminal portion 22 and while the other leg 34 lies in similar position outside the casing. Preferably a notch 28 is formed in the top surface of the terminal portion 22 to receive the transverse or curved portion of the wire clip 30. The clip is preferably formed with the interior leg 32 straight, while the exterior leg 34 has its end bent away from the casing in order to facilitate the sliding of the terminal plate 26 beneath said exterior leg and into position with one surface lying flush against the exterior surface of the terminal portion 22.

In order to provide additional friction between the surfaces of the terminal plate 26 and terminal portion 22, and to provide interlocking between those two members, a hole 22' may be punched in the terminal portion 22 in position to receive and be engaged with a deformation or bump 26' on the terminal plate 26.

To keep the clip 30 from moving laterally, the end of its inner leg 32 may be seated in a recess 13 formed in the floor of the casing adjacent the plane of the inner surface of the terminal portion 22 when in place. By means of the engagement, firstly, of the lower inner end of the clip leg 32 in this recess 13 and, secondly, of the bent or transverse portion 36 of the clip in the recess 28 in the top surface of the terminal portion 22, the clip is held at these two spaced points from moving laterally. At the same time, the plates 15 and 16 hold the clip within the casing.

By the exercise of sufficient force, the terminal plate 26 may be slid toward the back side or bottom of the casing over the surface of the terminal portion 22 to be disengaged from the terminal portion 22, if need should require.

In Figs. 6, 7 and 8, another form of the invention is illustrated wherein the terminal and contact member 20 are formed similarly to the form of Figs. 1–5, similar reference numerals being used to designate similar parts. The pigtail lead and terminal plate 46 may also be similar to the previously described form, or the pigtail lead, instead of being soldered to the terminal plate 26, may be connected thereto by crimping. For that purpose, the terminal plate 46 may originally be formed with lateral extensions at one end which will bend up and around the bared end of the pigtail connection by a conventional stamping or pressing operation.

In Figs. 6, 7 and 8, the clip 40 is stamped from thin sheet spring metal in a form similar in contour to the form of the clip 30.

The terminal plate 46 may have a tongue 47 lanced inwardly at the central portion thereof, providing a shoulder facing downwardly or toward the floor or back of the casing in position to engage in the bottom edge of the recess 22' formed in the terminal portion 22 of the terminal contact member. The engagement of this shoulder with the recess tends to prevent the pulling away of the terminal plate 46 from the terminal and contact member.

It may be desirable to enclose the connection of the terminal plate with the terminal-and-contact member in some instances. In such cases, the casing may be extended lengthwise to surround the connection, as illustrated in Fig. 6. A supplementary end wall 10e is joined to the extensions of the side walls and central partition of the casing, creating open-ended pockets 10p extending from front to rear of the casing and adapted to be closed at the top by the covering plates 15 and 16 when they are secured in place over the casing, the plates being of such length as to extend entirely over the casing and extension.

It will be understood that in both forms of the invention the spring clips are made of sufficient thickness and resilience to firmly hold the terminal plate 26 or 46 against the terminal portion 22 of the terminal and contact member.

Modifications in the form and configuration of parts may occur to those skilled in the art. Therefore, the invention is not limited to the exact form and configuration as illustrated and described.

What is claimed is:

1. An electric wire terminal connection comprising an insulating housing, an element of a wiring device inserted rectilinearly into said housing from one face thereof toward the opposite face, a U-shaped clip slidable upon said element over one edge with one leg pressing against the surface on one side of said element and another leg pressing against the surface on the opposite side of said element, an overlying plate on said housing over said edge of said element and holding said element and said clip in assembled position in the housing, and a terminal plate having an electric wire attached thereto and being slidable toward said overlying plate in-between said clip and the surface on the said one side of said element and retractable from said in-between position, said clip having an end bent to permit insertion and sliding of said plate, the other end of the clip being seated in a recess in said housing to hold said other end from lateral movement.

2. An electric wire terminal connection as claimed in claim 1 having the midportion of the clip seated in a notch in said conductive element and held therein by said plate on the housing.

3. An electric wire terminal connection as claimed in claim 2 in which said terminal plate has a formation thereon adapted to be received in a recess in the surface of said element to resist withdrawal of said terminal plate.

References Cited in the file of this patent

UNITED STATES PATENTS

| | | |
|---|---|---|
| 1,166,087 | Schmidt | Dec. 28, 1915 |
| 2,296,631 | Doane | Sept. 22, 1942 |
| 2,296,632 | Falge et al. | Sept. 22, 1942 |
| 2,318,650 | Penfold | May 11, 1943 |
| 2,448,267 | Landmeier | Aug. 31, 1948 |
| 2,471,923 | Batcheller | May 31, 1949 |
| 2,706,803 | Templeton | Apr. 19, 1955 |

FOREIGN PATENTS

| | | |
|---|---|---|
| 375,922 | Great Britain | July 7, 1932 |